United States Patent
Nakamura

[11] Patent Number: 5,938,986
[45] Date of Patent: Aug. 17, 1999

[54] METHOD AND APPARATUS FOR MANUFACTURING A GRADED REFRACTIVE INDEX PLASTIC OPTICAL-FIBER

[75] Inventor: Tetsuya Nakamura, Yokkaichi, Japan

[73] Assignee: Sumitomo Wiring Systems, Ltd., Yokkaichi, Japan

[21] Appl. No.: 09/042,467

[22] Filed: Mar. 16, 1998

[30] Foreign Application Priority Data

Mar. 17, 1997  [JP]  Japan .................................. 9-063138

[51] Int. Cl.⁶ ...................................................... B29D 11/00
[52] U.S. Cl. .......................... 264/1.24; 264/1.1; 264/1.29; 264/2.6; 264/2.7; 264/211.15; 425/71; 425/324.1; 425/404
[58] Field of Search ........................ 264/1.1, 1.29, 264/1.24, 1.27, 2.6, 2.7, 211.13, 211.14, 211.15; 425/324.1, 325, 404, 445, 71, 377

[56] References Cited

U.S. PATENT DOCUMENTS

| | | |
|---|---|---|
| 3,718,383 | 2/1973 | Moore . |
| 3,819,782 | 6/1974 | Irie . |
| 3,955,015 | 5/1976 | Ohtsuka et al. . |
| 5,390,274 | 2/1995 | Toyoda et al. . |
| 5,405,556 | 4/1995 | Liu ........................................... 264/2.6 |
| 5,541,247 | 7/1996 | Koike . |
| 5,614,253 | 3/1997 | Nonaka et al. . |
| 5,639,512 | 6/1997 | Nonaka et al. . |

FOREIGN PATENT DOCUMENTS

| | | |
|---|---|---|
| 63-218903 | 9/1988 | Japan . |
| 5-60931 | 3/1993 | Japan . |
| 6-186442 | 7/1994 | Japan . |
| 7-13029 | 1/1995 | Japan . |
| 7-27928 | 1/1995 | Japan . |
| 7-5329 | 1/1995 | Japan . |
| 9-218311 | 8/1997 | Japan . |
| 9-218312 | 8/1997 | Japan . |

OTHER PUBLICATIONS

An English Language abstract of JP 63–218903.
An English Language abstract of JP 7–27928.
An English Language abstract of JP 7–5329.
An English Language abstract of JP 7–13029.
An English Language abstract of JP 6–186442.
An English Language abstract of JP 5–60931.
An English Language abstract of JP 9–218311.
An English Language abstract of JP 9–218312.

*Primary Examiner*—Mathieu D. Vargot
*Attorney, Agent, or Firm*—Greenblum & Bernstein, P.L.C.

[57] ABSTRACT

A plastic optical-fiber is provided having a desired length and a desired graded refractive index. To this end, a base polymer is mixed with a non-polymerizable compound having a higher refractive index to obtain a fiber material. This material is then transformed continuously into a fiber in a fiber-preparing unit. A plurality of diffusion tanks are each provided with a solution, each solution having a level of viscosity different from one another. The fiber is then dipped successively into the solutions in the order from a lowest viscosity level to a higher viscosity level. During this process, the non-polymerizable compound and polymerizable compound diffuse inside the fiber and form a graded refractive index distribution. The polymerizable compound is then polymerized and hardened in a drying-and-heating unit. The fiber thus obtained is drawn and coated with a cladding.

13 Claims, 3 Drawing Sheets

METHOD AND APPARATUS FOR MANUFACTURING A GRADED REFRACTIVE INDEX PLASTIC OPTICAL-FIBER

BACKGROUND OF THE INVENTION

1. Field of the Invention

The present invention relates to a method for manufacturing a graded index type plastic optical-fiber and a manufacturing apparatus therefor.

2. Description of Background Information

For manufacturing this type of plastic optical fiber, several methods have been disclosed, for example, in published Japanese Patent Application Nos. HEI 5-507610 and HEI 7-27928.

In the method described in Application No. HEI 5-507610, a cladding is formed of a cylindrical tube having a hollow central part which is filled with a liquid mixture consisting of a monomer and a compound having a high refractive index. The liquid mixture is then heated or irradiated with energy-carrying rays, thereby generating and propagating a polymerization reaction, preferentially on a predetermined site. The compound having a high refractive index thus forms a density gradient in the resulting product which is used as a base material. The base material is melted by heating and is drawn so as to continuously vary its refractive index along the radial direction. This base material constitutes the core part of the plastic optical fiber.

In the method disclosed in Application No. HEI 7-27928, a polymerized fiber material is melted by heating and then spun to form a fiber. The fiber thus obtained is soaked in a solution containing a non-polymerizable compound having a refractive index lower than that of the initial polymer, whereby this non-polymerizable compound is impregnated and diffused into the fiber. In this manner, a plastic optical fiber having a graded index is formed.

However, in the method disclosed in Application No. HEI 5-507610, the fiber is formed by heating, fusing and drawing the base material. The fiber length producible from one base material is thus limited, i.e., the fiber length depends on the size of the base material.

In order to manufacture a longer fiber, the base material must have a thicker diameter or must be of a longer dimension size. When the base material is thickened, the subsequent drawing process becomes difficult because of insufficient heating and fusing. When the base material is lengthened, the material should have a uniform graded index and constant transmission loss in the longitudinal direction. However, the manufacture of such a material requires stringent conditions to be satisfied for controlling the reactions and polymerization. When manufacturing a plastic optical fiber having a length over 1,000 m and a diameter of 1 mm, a one-meter base material should have a diameter over 30 m.

Further, this method is a batch system in which a base material is first prepared, drawn, and then transformed into an optical fiber. The running ratio of the process therefore is not good and, as the production increases, the manufacturing facilities must be scaled up greatly.

In the method disclosed in Application No. HEI 7-27928, the fiber is continuously manufactured, so that it can be made with a desired length. However, after the fiber is manufactured, it has to enable a non-polymerizable compound to diffuse from its surface inwards. A large molecular-size, low refractive-index compound is, however, difficult to diffuse into such a fiber, so that the refractive index is poorly graded.

In order to diffuse a large molecular-size, low refractive-index compound into the fiber, the compound and the fiber must be heated to a high temperature. However, intense heating tends to melt and cut the fiber and the fiber manufacturing becomes inconsistent.

In view of the above, an object of the invention is to provide a new method of manufacturing a graded-index type, plastic optical fiber and a manufacturing apparatus therefor. This method attains a good running ratio of the process and minimizes the scaling-up of installation required for production increase. Further, the plastic optical fiber is easily provided with a desired graded index. Moreover, the graded-index fiber can be manufactured, continuously and constantly, in a desired length with a constant quality.

SUMMARY OF THE INVENTION

In order to solve the above-mentioned problem, there is provided a method for continuously manufacturing a graded refractive-index type plastic-optical fiber, including:

preparing a fiber material including a base polymer and a non-polymerizable compound having a refractive index higher than that of the base polymer;

heating and melting the fiber material, thereby obtaining a fiber having a center portion and a peripheral portion;

preparing a plurality of solutions containing a polymerizable compound, the solutions have a level of viscosity differing between one another, including a lowest-viscosity solution to a higher-viscosity solution; and dipping the fiber into the solutions successively from the lowest-viscosity solution to the higher-viscosity solution;

so that the non-polymerizable compound and the polymerizable compound diffuse inside the fiber, whereby the graded refractive index is distributed decreasingly from the center portion of the fiber to the peripheral portion thereof.

Advantageously, the method may alternatively further include:

curing the fiber, whereby the polymerizable compound is polymerized; drawing, so that the fiber gets an appropriate orientation; and forming a cladding around the fiber.

Furthermore, the base polymer can be formed of at least one monomer chosen from the group including an acrylate, a methacrylate, a styrene-based compound, a fluoroacrylate and a fluoromethacrylate.

Advantageously, the non-polymerizable compound has a refractive index higher than that of the base polymer by at least 0.02; and the non-polymerizable compound may be at least one compound chosen from the group consisting of hexyl acetate, benzyl benzoate, bis(2-methylhexyl)phthalate, dibutyl sebacate, dihexyl adipate, dimethyl phthalate and diphenyl sulfide.

Additionally, the polymerizable compound may be a monomer forming the same polymer as the base polymer when polymerized, and the base polymer may include poly(methyl methacrylate) and the polymerizable compound comprises methyl methacrylate.

Furthermore, the method may further include a polymerization-inhibiting agent, and the level of viscosity may be controlled by adding a polymer compound into the solutions.

As explained above, the manufacturing method relates to a continuous method for continuously manufacturing plastic optical fibers and not to a batch processing method. Therefore, the method is run with a high running ratio and enables reducing the necessity of equipment scaling-up even if the production is increased. It also enables producing a graded refractive index type fiber in a desired length.

Further, as a non-polymerizable compound is previously mixed with the base polymer of the fiber, the glass transition temperature of the polymer is lowered. The polymer is thus dissolved more easily into the solution of each diffusion tank. Accordingly, when the fiber is soaked in each solution, the compound in each solution easily penetrates into the fiber, without requiring any high temperature heating. The non-polymerizable compound then diffuses easily and quickly in the fiber, thereby forming a proper refractive index distribution. At the same time, the rupture of the fiber due to high temperature heating, as disclosed in Application No. HEI 7-27928, can be avoided. A plastic optical fiber can thus be produced in a constant manner.

Moreover, the fiber is soaked in the solution successively from a lower-viscosity solution to a higher viscosity one. Therefore, the non-polymerizable compound uniformly diffuses inside the fiber, while restraining the elution of the fiber-constituting polymer and local diffusion drifts. Accordingly, the method prevents the refractive index from being distributed in a disorderly manner, and allows a plastic optical fiber to be produced with a stable quality.

The present invention also relates to a device for continuously manufacturing a graded refractive-index type plastic-optical fiber, including:

a mechanism for preparing a fiber material including a base polymer and a non-polymerizable compound having a refractive index higher than that of said base polymer;

a unit for heating and melting the fiber materials and for obtaining a fiber;

an apparatus providing a plurality of solutions containing a polymerizable compound, the solutions having a level of viscosity differing from one another, including a lowest-viscosity solution to a higher-viscosity solution; and a device for dipping the fiber into the solutions successively from the lowest-viscosity solution to the higher-viscosity solution.

Advantageously, the device may further alternatively include a device for curing the fiber, a device for drawing the fiber and a device for forming a cladding around the fiber.

The base polymer of the invention includes a non-crystalline high-molecular size substance, such as poly (methyl methacrylate), polystyrene, polycarbonate, or the like. Preferably, this base polymer has only a small transmission loss due to dispersion and absorption in the wavelength range of the light source used. To obtain such a polymer, a monomer belonging to a group such as methacrylates, styrene-based compounds, fluoroacrylates, fluoromethacrylates, or the like may be used.

Examples of each monomer group are described hereinafter.

(a) methacrylates and acrylates:

methyl methacrylate, ethyl methacrylate, isopropyl methacrylate, t-butyl methacrylate, benzyl methacrylate, phenyl methacrylate, cyclohexyl methacrylate, diphenylmethyl methacrylate, ethyl acrylate, methyl acrylate, n-butyl acrylate, etc.;

(b) styrene-based compounds:

styrene, α-methylstyrene, chlorostyrene, bromostyrene, dichlorostyrene, dibromstyrene, etc.;

(c) fluoroacrylates:

2,2,2-trifluoroethyl acrylate, etc.;

(d) fluoromethacrylates:

1,1,2-trifluoroethyl methacrylate, etc.

To prepare a fiber material of the invention, any one of the above-mentioned monomers may be used to form a polymer, which is subsequently used as the base polymer. A plurality of monomers may also be used to form a copolymer for the same purpose.

The fiber material also contains a non-polymerizable compound. This compound preferably has a refractive index higher than that of the above polymer by at least 0.02, a good compatibility with the polymer and its monomers, and a boiling point higher than 200° C.

Examples of the non-polymerizable compound include hexyl acetate, benzyl benzoate, bis(2-methylhexyl) phthalate, a sebacic acid ester such as dibutyl sebacate, an adipate such as dihexyl adipate, dimethyl phthalate, diphenyl sulfide, and the like. Preferably, one or more compounds are used in combination, according to the refractive index of the base polymer.

The solution used in each diffusion tank may be a substance which is able to diffuse into the fiber polymer and which has a small molecular size and a low molecular weight. Preferably, this solution is a polymerizable compound (monomer), more preferably the solution is the monomer corresponding to the constituent monomer of the polymer used for the fiber.

When the solution is a monomer, its viscosity may be adjusted by varying the proportion of the polymer to be dissolved in the monomer.

When the monomer used is methyl methacrylate (MMA), examples of the polymer used for that purpose include a polymethacrylate such as poly(methyl methacrylate) (PMMA) or the like, a polyacrylate such as poly(ethyl acrylate) or the like, a polyether, such as poly(ethylene oxide) and other polymers such as poly(vinyl alcohol), poly(vinyl acetate), polystyrene or the like.

Further, when the monomer solution becomes more viscous, the monomer tends to polymerize. Therefore, the monomer is preferably supplemented with 0.001% by weight of an inhibitor such as hydroquinone.

BRIEF DESCRIPTION OF THE DRAWINGS

The above and other features and advantages of the present invention will be made apparent from the following description of preferred embodiments, given as non-limiting examples with reference to the accompanying drawings, in which.

DETAILED DESCRIPTION OF THE PREFERRED EMBODIMENTS

Figure 1:
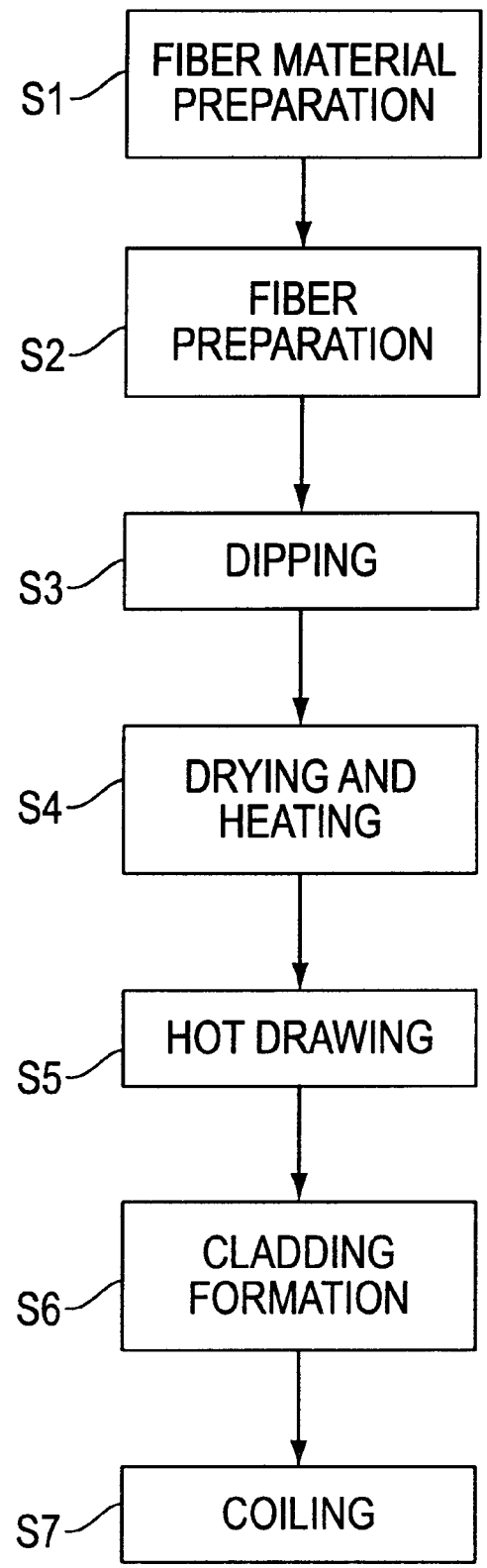
FIG. 1 is a flow chart illustrating the manufacturing process of a graded-index type plastic optical fiber.
Figure 2:
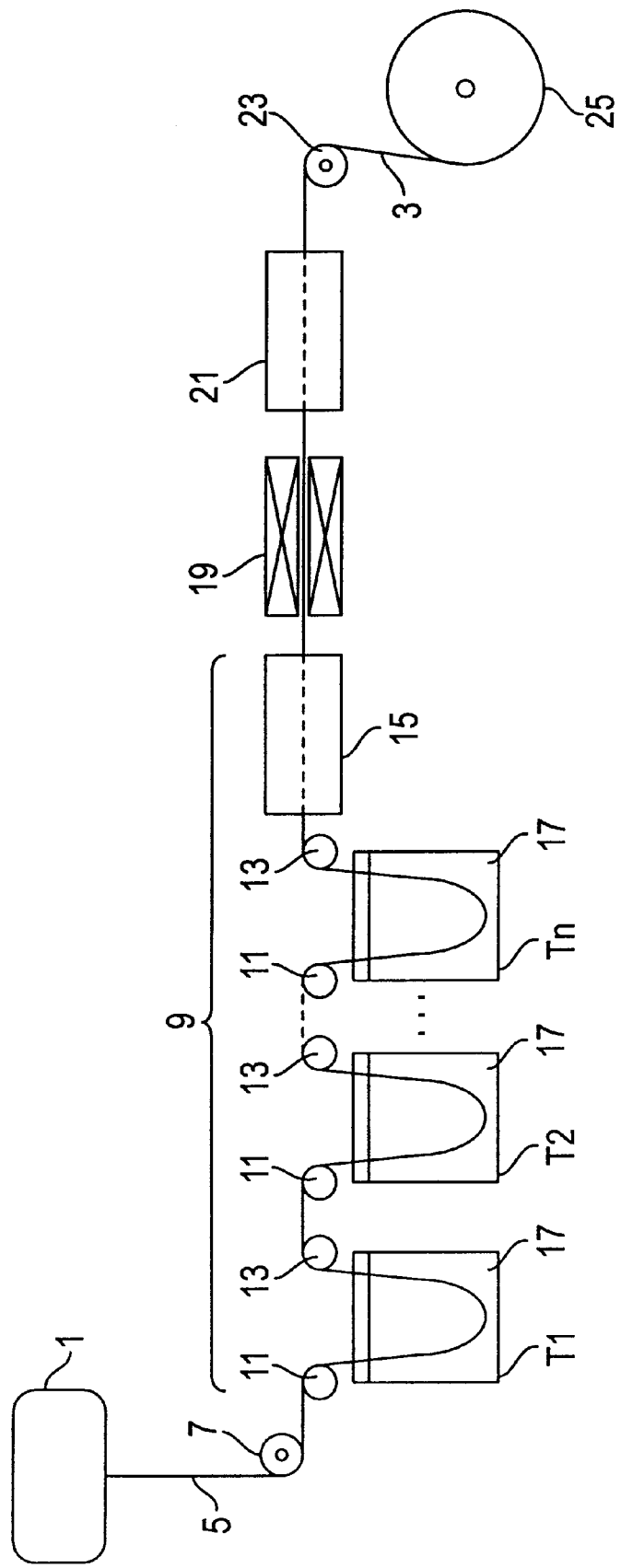
FIG. 2 shows the structural units of the installation used for the process shown in FIG. 1.

FIG. 1 is a flow chart showing the manufacturing process of the graded-index type plastic optical fiber according to a first embodiment, while FIG. 2 shows the structure of the manufacturing units used for this process. In the first manufacturing step (S1), a fiber material is prepared. To prepare this material, a monomer, or a plurality of monomers, are mixed with a non-polymerizable compound having a higher refractive index than the polymer which is to be produced from the aforementioned monomers. The mixture is heated under stirring to give a hardened polymer. The latter is crushed and pelletized. Polymerization is controlled so as to obtain an average molecular weight of 100,000 to 200,000, preferably 130,000 to 150,000.

Figure 3:
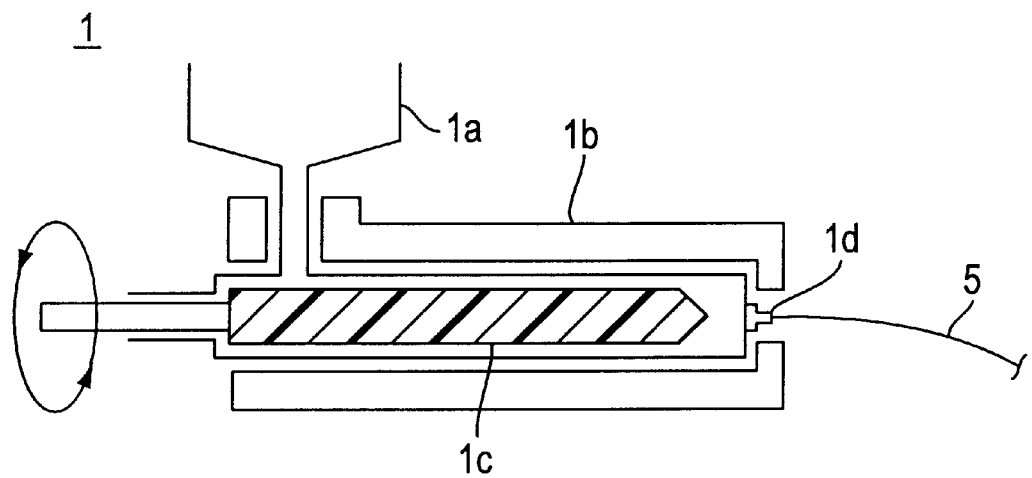
FIG. 3 shows the construction of the fiber-preparing unit of FIG. 2.

The pelletized fiber material is fed into a fiber-preparing unit 1 having a structure shown in FIG. 3, via a hopper 1$a$. The pelletized fiber material supplied through the hopper 1$a$ is melted by a heater 1$b$, kneaded by a screw 1$c$ and spun out from a die point 1$d$ to form a fiber. In this manner, the fiber 5, which subsequently forms the core part of the plastic optical fiber, is continuously manufactured (step S2).

The fiber 5 manufactured by the fiber-preparing unit 1 is sent to a turn roller 7 and then into a refractive index grading unit 9. The refractive index grading unit 9 includes a plurality of diffusion tanks $T_1$ to $T_n$ (with n being an integer equal to or greater than 2). Each diffusion tank $T_1$ to $T_n$ is equipped with conveyor devices such as a feed roller 11 and an exit roller 13. The refractive index grading unit 9 further includes a drying-and-heating unit 15.

Each diffusion tank $T_1$ to $T_n$ contains a monomer 17 having a viscosity different from one another. The viscosity of the monomer 17 increases gradually from the first diffusion tank $T_1$ to the $n^{th}$ diffusion tank $T_n$. The viscosity of each monomer 17 is adjusted by controlling the proportion of a polymer to be mixed with the monomer. By increasing the proportion of the polymer, the viscosity of the monomer 17 is also enhanced.

Feed roller 11 and exit roller 13 supply the fiber 5 delivered by a conveyor into each of diffusion tanks $T_1$ to $T_n$ successively, and thus pass the fiber 5 through the monomer 17. The conveyor speed of the feed rollers 11 and the exit rollers 13 is set to a constant level, so that the fiber 5 continuously supplied by the feed roller 11 into the monomer 17 is withdrawn therefrom by the exit roller 13, with a corresponding speed.

The fiber 5 delivered from the fiber-preparing unit 1 is conveyed by feed rollers 11 and exit rollers 13 and successively soaked in each of diffusion tanks $T_1$ to $T_n$ (step S3).

The fiber 5 formed of the polymer is easily dissolved in the monomer. The lower the viscosity of the monomer is, the easier the dissolution of the polymer is. In the present embodiment, a plurality of diffusion tanks $T_1$ to $T_n$ is prepared, each tank is filled with a monomer 17 having a level of viscosity different from one another. Each diffusion tank $T_1$ to $T_n$ is filled with a monomer 17 having a gradually increasing viscosity. The fiber 5 is soaked successively from the lowest-viscosity monomer 17 to a higher-viscosity monomer 17. In this manner, the polymer constituting the fiber 5 is prevented from eluting into the monomer 17. At the same time, the previously mixed non-polymerizable compound which has a low refractive index and the monomer 17 penetrate from the surface of the fiber 5 inwards and diffuse inside the fiber.

As the monomer 17 for dipping fiber 5 becomes more viscous, the polymer of the fiber 5 becomes less soluble in the monomer 17. At the same time, the non-polymerizable compound diffuses in the fiber 5 further on. As a result, the non-polymerizable forms a density gradient inside the fiber 5, such that the refractive index decreases proportionally to the square of the distance measured from the fiber center.

Fiber 5 is withdrawn from the last diffusion tank $T_n$ by exit roller 13 and led to the drying-and-heating unit 15, where the fiber is dried and heated. The monomer 17, either diffused inside the fiber 15 or remaining on the surface thereof, is polymerized and hardened (step S4). The unit 15 may, for example, include a cylindrical heater. The fiber 5 is passed through the hollow part of the heater where warm air is ventilated whereby the fiber 5 is dried and heated.

After passing through the drying-and-heating unit 15, the fiber 5 is sent to a hot drawing unit 19, where the fiber is hot-drawn. The process gives an appropriate orientation to the fiber which has no ordered texture after soaking. It also gives a mechanical resistance to the fiber (step S5).

The drawn fiber is then sent to the cladding formation unit 21 for forming for cladding (step S6). This cladding is formed by extruding a cladding material (resin) around the continuously delivered fiber 5, thereby forming a cladding. This cladding is formed from a transparent resin having a refractive index lower than that of the fiber material of the core portion, i.e., the fiber 5.

As is mentioned above, the fiber 5 is processed successively through the diffusion tanks $T_1$ to $T_n$, a drying-and-heating unit 15, a drawing unit 19 and a cladding-formation unit 21 and forms a plastic optical fiber 3. This optical fiber 3 is then sent to a turn roller 23 and reeled continuously on a coiler 25 (step S7). Once reeled on coiler 25, the plastic optical fiber 3 is uncoiled and coated with polyethylene, poly(vinyl chloride), etc., thereby forming an optical fiber cable or cord.

According to the present embodiment, the plastic optical fiber is manufactured continuously and not by a batch system. The process is therefore performed with a high running ratio, minimizes the necessity of scaling-up of the facilities, even though the production is to be increased, and allows obtaining an index-grading type, plastic optical fiber with a desired length.

As a high refractive index, non-polymerizable compound is preliminarily blended with the base polymer of fiber 5, the glass-transition temperature of the polymer is lowered and its solubility in monomers 17 is increased. As such, when the polymer is dipped in monomers 17, the fiber 5 is easily impregnated with the monomers 17 without excessive heating and the non-polymerizable compound is diffused easily and rapidly in the fiber 5. Therefore, grading of the refractive index is easily accomplished. Moreover, the process enables avoiding the melting off of the fiber 5, which is caused when it is heated at a high temperature as described in published Japanese Application No. HEI 7-27928, and produces the plastic optical fiber 3 in a constant manner.

Further, the monomer 17 used in diffusion tanks $T_1$ to $T_n$ has a small molecular size. Therefore, it can be diffused easily in the fiber 5, so that the refractive index can be easily graded. As the fiber 5 is soaked in diffusion tanks $T_1$ to $T_n$, successively from a low-viscosity solution to a higher-viscosity solution, the non-polymerizable compound diffuses uniformly inside the fiber 5, without causing local variations, while the polymer of fiber 5 is prevented from eluting out. This process avoids causing a disorderly distribution of the refractive index. The present method thus enables producing a plastic optical-fiber of a constant quality.

Further, the fiber material for fiber 5 is pelletized, melted by heating, blended and spun. Therefore, even if the fiber material contains heterogeneous portions before pelletizing, these can be completely homogenized by blending in fiber-forming unit 1 and transformed into a homogeneous plastic optical fiber 3.

Also, the plastic optical fiber 3 is coated with a cladding. This restrains the increase of optical loss caused by the flexion of fiber 3.

Further, the cladding-formation step (S6) is effected after the hot-drawing step (S4). However, it can also be performed before the hot-drawing step (S5).

First and second examples of the embodiments according to the present invention are described hereinafter.

EXAMPLE 1

In the fiber material preparing step, 83 parts by weight of MMA and 17 parts by weight of benzyl benzoate (BEN) were mixed. To this, 0.5 part by weight of butyl peroxide (PBD) as a polymerization initiator was added and mixed. After stirring, the mixture was put under vacuum (1 Torr) by pumping the air out. After having removed the air sufficiently, the mixture was stirred slowly in a warm water bath at 40° C. for 48 hours under vacuum, during which polymerization was initiated. The mixture was further polymerized for 24 hours under vacuum in an air bath at 60° C., whereby the polymer as a material for fiber 5 was formed. The polymer thus obtained had a weight-average molecular weight of 120,000 to 150,000. The polymer was crushed into a particle size of 3 mm by a micro-hammer mill and pelletized.

To homogenize the quality difference of the pellets, they were carefully mixed, melted by heating, kneaded at a temperature maintained at 220° C. in the heater 1b (FIG. 3) and spun into fiber 5 having a diameter of 3.4 mm. According to this embodiment, two diffusion tanks were prepared. The first tank contained a mixture solution of a monomer (MMA), 0.1% by weight of azobisisobutyronitrile as a polymerization initiator and 0.1% by weight of n-butyl mercaptan, as a chain-transfer agent. The solution was set to 20° C. and had a viscosity of 5 cSt (centistokes). The second tank contained a mixture solution of monomer (MMA), 5% by weight of PMMA for viscosity control and 0.01% by weight of hydroquinone as a polymerization inhibitor. The solution was carefully stirred for one hour by a wing stirrer and rendered into a homogeneous mixture. The solution of the second tank had a viscosity of 300 cSt and was kept at a constant temperature of 20° C.

The fiber 5 having a diameter of 3.4 mm was first soaked into the first diffusion tank solution for 10 minutes. After soaking, the diameter of the fiber was 2.83 mm.

Fiber 5 was further soaked in the second tank for 20 minutes and then withdrawn therefrom. The fiber was then heated gradually from 50° C. to 80° C. in the drying-and-heating unit 15, whereby the monomer, either diffused into fiber 5 or remaining on the surface thereof, was completely polymerized and hardened.

The fiber diameter still measured 2.83 mm when withdrawn from the second tank. The dipping into the second diffusion tank did not therefore reduce the diameter of fiber 5.

Subsequently, fiber 5 was drawn down to a diameter of 0.9 mm in a hot drawing step. In the cladding-formation step, poly(1,1,2-trifluoro ethylmethacrylate) was melted at about 120 to 130° C. and extruded around the fiber 5 to form a cladding.

Figure 4A:
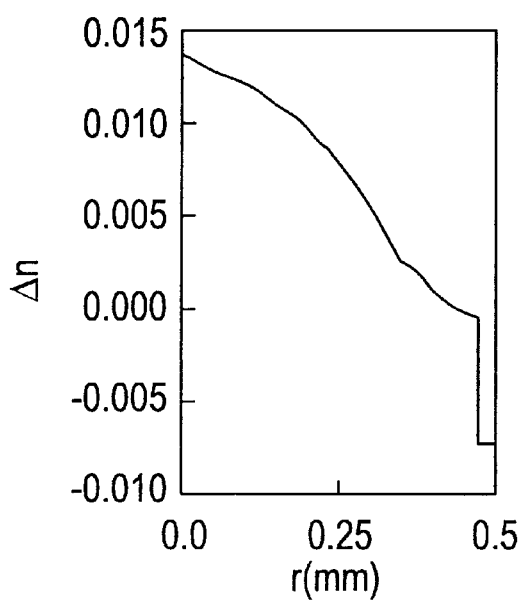
FIGS. 4(a) and 4(b) are graphs showing the refractive index grading of the plastic optical fiber obtained in the first and the second example, respectively.

As a result, a plastic optical fiber 3 having a graded index shown in FIG. 4(a) was obtained. This fiber 3 had a diameter of 1 mm. According to tensile tests, the tensile strength at break was 90 MPa, while the elongation at break was 110%. The difference $\Delta n$ of the refractive index between the core center and the core periphery was 0.013. The transmission loss was 187 dB/km. The graded index distribution was not disrupted in the longitudinal direction of the fiber. The distribution of the graded index was measured by a shearing interference microscope. The transmission loss was measured by a cut-back method from 50 m to 5 m.

EXAMPLE 2

To increase $\Delta n$, diphenyl sulfide having a high refractive index (n=1.632) was used as a non-polymerizable compound for grading the refractive index. Further, three diffusion tanks were used for monomer dipping. The other processes were the same as in Example 1.

In the fiber-material preparing step, 83 parts by weight of MMA and 17 parts by weight of diphenyl sulfide were mixed. To this, 0.5 part by weight of t-butyl peroxide (PBD) as an initiator was added and stirred. After stirring, the mixture was put under a vacuum of 1 Torr by pumping the air out. After having removed the air sufficiently, the mixture was stirred slowly in a warm water bath at 40° C. for 48 hours under vacuum, during which polymerization was initiated. The mixture was further polymerized for 24 hours under vacuum in a warm air bath at 60° C., whereby the polymer as a material for fiber 5 was formed.

The polymer thus obtained had a weight-average molecular weight of 120,000 to 150,000. The polymer was crushed into a particle size of 3 mm by a micro-hammer mill and pelletized.

To homogenize the quality difference of the pellets, the pellets were carefully mixed, melted by heating, kneaded at a temperature maintained at 220° C. in the heater 1b (FIG. 3) and spun into fiber 5 having a diameter of 3.4 mm. Three diffusion tanks were prepared. The dipping duration in the first diffusion tank, which contains the lowest-viscosity solution, allows elution of the constituent polymer from fiber 5 and can cause diametrical or graded index drifts. Further, by increasing the number of tanks, the diffusion of a non-polymerizable compound such as diphenyl sulfide can be controlled more easily.

The first tank contained a mixture of monomer MMA, 0.1% by weight of azobisisobutyronitrile as an initiator and 0.1% by weight of n-butyl mercaptan as a chain-transfer compound. The temperature of the monomer was set to 20°. The viscosity of the monomer was 5 cSt.

The second diffusion tank contained a mixture of monomer MMA, 3% by weight of PMMA for viscosity control and 0.01% by weight of hydroquinone used as a polymerization inhibitor. The mixture was stirred for one hour with a wing stirrer and rendered into a homogeneous solution. The solution in the second diffusion tank had a viscosity of 100 cSt and was kept at a constant temperature of 20° C.

The third tank contained a mixture of MMA monomer, 9% by weight of PMMA for viscosity control and 0.01% by weight of hydroquinone used as an inhibitor. The mixture was stirred for one hour with a wing stirrer and rendered into a homogeneous solution. The solution in the third diffusion tank had a viscosity of 800 cSt and was kept at a constant temperature of 20° C.

A 3.4 mm diameter fiber 5 was first soaked in the first diffusion tank containing only the monomer for five minutes. The fiber 5 had a diameter of 3.02 mm. Thereafter, the fiber 5 was soaked in the second diffusion tank for 10 minutes and withdrawn therefrom. At that time, the fiber had a diameter of 2.81 mm. The fiber 5 was then soaked in the third diffusion tank for 12 minutes and then withdrawn therefrom. The fiber was gradually heated from 50° C. to 80° C. in the drying-and-heating unit 15, during which the monomer, either diffused into the fiber 5 or remaining on the surface thereof, was completely polymerized and hardened. The fiber 5, when withdrawn from the third diffusion tank, had a 2.81 mm diameter. Therefore, the soaking in the third diffusion tank did not reduce the fiber diameter.

After drying and heating, fiber 5 was drawn into a diameter of 0.9 mm through a hot drawing process. In the cladding formation step, poly(1,1,2 trifluoroethylmethacrylate) was melted at a temperature between 120° C. and 130° C. and extruded around the fiber 5 to form a cladding.

Figure 4B:
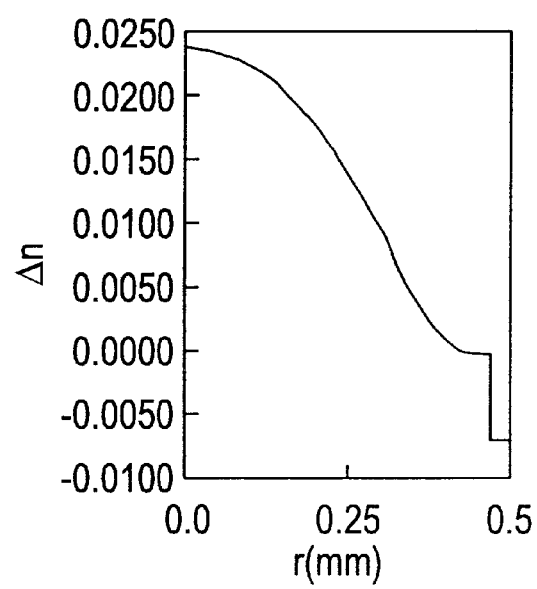

As a result, a plastic optical fiber 3 having a graded index shown in FIG. 4(*b*) was obtained. This fiber 3 had a diameter of 1 mm. According to tensile tests, the tensile strength at break was 90 MPa and the elongation at break was 110%. The difference Δn of the refractive index between the core center and the core periphery was 0.024. The transmission loss was 176 dB/km. There was no disruption of the graded index distribution in the longitudinal direction of the fiber.

A comparative example with regard to Examples 1 and 2 will be described hereinafter.

In the fiber-material preparing step, 83 parts by weight of MMA and 17 parts by weight of benzyl benzoate (BEN) were mixed. To this, 0.5 part by weight of butyl peroxide (PBD) as a polymerization-initiator was added and stirred. After stirring, the mixture was put under a vacuum of 1 Torr by pumping the air out. After having removed the air sufficiently, the mixture was stirred slowly in a warm water bath at 40° C. for 48 hours under vacuum, during which polymerization was initiated. The mixture was further polymerized for 24 hours under vacuum in an air bath at 60° C., whereby the polymer as a material for fiber 5 was formed.

The polymer thus obtained had a weight-average molecular weight of 120,000 to 150,000. The polymer was crushed into a particle size of 3 mm by a micro-hammer mill and pelletized.

To homogenize the quality difference of the pellets, the pellets were carefully mixed, melted by heating, kneaded at a temperature maintained at 220° C. in heater 1*b* (FIG. 3) and spun into fiber 5 having a diameter of 3.4 mm. The fiber 5 was soaked in a single diffusion tank. This diffusion tank contained a mixture of monomer MMA, 0.1% by weight of azoisobutyronitrile as an initiator and 0.1% by weight of n-butyl mercaptan as a chain-transfer compound. The monomer was kept at a constant temperature of 20° C.

Fiber 5 having a diameter of 3.4 mm was soaked in the solution containing only the monomer for 10 minutes. At this step, the fiber had a diameter of 2.83 mm. The fiber 5 was then heated gradually from 50° C. to 80° C. in the drying-heating unit 15, during which the monomer, either diffused into the fiber 5 or remaining on the surface thereof, was completely polymerized and hardened.

After drying and heating, fiber 5 was drawn into a diameter of 0.9 mm during the hot-drawing step. In the cladding-formation step poly(1,1,2 trifluoroethylmethacrylate) was melted at a temperature between 120° C. and 130° C. and extruded around the fiber 5 to form the cladding.

The plastic optical fiber obtained according to the comparative example showed a flat shoulder at the core center, in the distribution curve of the refractive index. A bi-dimensional distribution of the refractive index could not therefore be obtained.

Accordingly, in the present invention, the non-polymerizable compound diffused sufficiently so that a desired bi-dimensional distribution of the refractive index was obtained.

As seen in the comparative example, when fiber 5 was soaked in a solution containing only the monomer for 10 minutes, the non-polymerizable compound could not diffuse sufficiently, which explains an improper bi-dimensional distribution of the refractive index.

Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

The present disclosure relates to subject matter contained in priority Japanese Application No. HEI 9-063138 filed on Mar. 17, 1997, which is herein expressly incorporated by reference in its entirety.

What is claimed:

1. A method for continuously manufacturing a graded refractive-index plastic-optical fiber, comprising:

preparing a fiber material including a base polymer and a non-polymerizable compound having a refractive index higher than that of said base polymer;

heating and melting said fiber material, thereby obtaining a fiber having a center portion and a peripheral portion;

preparing a plurality of solutions containing a polymerizable compound, said solutions having a level of viscosity differing between one another, including a lowest-viscosity solution to a higher-viscosity solution; and dipping said fiber into said solutions successively from said lowest-viscosity solution to said higher-viscosity solution;

so that said non-polymerizable compound and said polymerizable compound diffuse inside said fiber, whereby said graded refractive index is distributed decreasingly from said center portion of said fiber to said peripheral portion thereof.

2. The method according to claim 1, wherein said method further comprises curing said fiber, whereby said polymerizable compound is polymerized.

3. The method according to claim 2, wherein said method further comprises drawing said fiber, so that said fiber gets an appropriate orientation.

4. The method according to claim 3, wherein said method further comprises forming a cladding around said fiber.

5. The method according to claim 1, wherein said base polymer is formed of at least one monomer chosen from the group consisting of an acrylate, a methacrylate, a styrene-based compound, a fluoroacrylate and a fluoromethacrylate.

6. The method according to claim 1, wherein said non-polymerizable compound has a refractive index higher than that of said base polymer by at least 0.02.

7. The method according to claim 1, wherein said non-polymerizable compound is at least one compound chosen from the group consisting of hexyl acetate, benzyl benzoate, bis(2-methylhexyl)phthalate, dibutyl sebacate, dihexyl adipate, dimethyl phthalate and diphenyl sulfide.

8. The method according to claim 1, wherein said polymerizable compound is a monomer forming the same polymer as said base polymer when polymerized.

9. The method according to claim 1, wherein said base polymer comprises poly(methyl methacrylate) and said polymerizable compound comprises methyl methacrylate.

10. The method according to claim 1, wherein said solutions further comprise a polymerization-inhibiting agent.

11. The method according to claim 1, wherein said level of viscosity is controlled by adding a polymer compound to said solutions.

12. A device for continuously manufacturing a graded refractive-index plastic-optical fiber, comprising:

a mechanism for preparing a fiber material comprising a base polymer and a non-polymerizable compound having a refractive index higher than that of said base polymer;

a unit for heating and melting said fiber material and for obtaining a fiber;

an apparatus providing a plurality of solutions containing a polymerizable compound, said solutions having a level of viscosity differing between one another, including a lowest-viscosity solution to a higher-viscosity solution; and a device for dipping said fiber into said solutions successively from said lowest-viscosity solution to said higher-viscosity solution.

13. The device according to claim 12, further comprising a device for curing said fiber, a device for drawing said fiber and a device for forming a cladding around said fiber.

* * * * *